United States Patent
Suzuki et al.

(10) Patent No.: US 7,410,311 B2
(45) Date of Patent: Aug. 12, 2008

(54) PRINT DATA EDITING DEVICE, PRINT DATA EDITING PROGRAM AND COMPUTER READABLE RECORDING MEDIUM

(75) Inventors: Yuichiro Suzuki, Okazaki (JP); Naoki Tanjima, Nagoya (JP); Naomi Yamamoto, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 95 days.

(21) Appl. No.: 11/288,535

(22) Filed: Nov. 29, 2005

(65) Prior Publication Data

US 2006/0222428 A1 Oct. 5, 2006

(30) Foreign Application Priority Data

Mar. 31, 2005 (JP) ............................. 2005-100490

(51) Int. Cl.
*B41J 11/44* (2006.01)

(52) U.S. Cl. ............................ 400/76; 400/70; 358/1.18
(58) Field of Classification Search ................... 400/70, 400/76; 358/1.15–1.18
See application file for complete search history.

(56) References Cited

U.S. PATENT DOCUMENTS

| | | | | |
|---|---|---|---|---|
| 5,403,101 A | * | 4/1995 | Nagase et al. | 400/3 |
| 5,496,118 A | * | 3/1996 | Ueno et al. | 400/61 |
| 5,967,679 A | * | 10/1999 | Beadman et al. | 400/615.2 |

* cited by examiner

*Primary Examiner*—Minh H Chau
(74) *Attorney, Agent, or Firm*—Day Pitney LLP

(57) ABSTRACT

A print editing device is provided wherein a first line of the print data is aligned to a first end in a predetermined print area and, if there are plural lines; a last line of the print data is aligned to a second end and a remaining line is aligned between the first and second end when the print data is determined to include more than three lines.

8 Claims, 19 Drawing Sheets

US 7,410,311 B2

PRINT DATA EDITING DEVICE, PRINT DATA EDITING PROGRAM AND COMPUTER READABLE RECORDING MEDIUM

CROSS-REFERENCE TO RELATED APPLICATION

This application claims priority from Japanese Patent Application No. 2005-100490, filed Mar. 31, 2005, the disclosure of which is incorporated herein in its entirely by reference thereto.

BACKGROUND OF THE INVENTION

1. Field of the Invention

The disclosure relates to a print data editing device, a program for making the computer function as the print editing device and a recording medium.

2. Description of the Prior Art

Generally, in print data editing device for obtaining desired print result such as word processor, a user inputs characters and figures and properly aligns the inputted character and figures in desired print area. Such alignment is generally provided by the user's manual inputting on display. To reduce such labor, Japanese Patent Application Laid-Open No. HEI 5-346947 discloses a print data editing device which automatically properly aligns.

SUMMARY OF THE INVENTION

In the above-described print data editing device, the automatic alignment can be done based on left, right alignment and centering for lateral and vertical writing. However, the print data editing device is not a device that meets a demand for obtaining entirely well-balanced alignment for the characters such as a title label.

The disclosure is to solve the above-described problem. The one object of the disclosure is to provide a print editing device capable of well-balanced alignment of character strings of plural lines in the print area, a print data editing program and a recording medium thereof.

To achieve the above-described object, according to a first aspect of the disclosure, there is provided a print data editing device comprising a memory that stores print data; a controller that reads the print data stored in the memory, the controller aligns the first line of the print data to a first end of a predetermined print area, the controller determines whether the print data includes plural lines, said controller aligns a last line of the print data to a second end when the print data is determined to include plural lines, and aligns a remaining line between the first and second ends, the remaining line being line other than the first and last line when the print data is determined to include more than three lines.

According to a second aspect of the disclosure, there is provided a computer readable medium containing instructions for controlling a computer to perform print editing, by a storing step of storing print data; a first aligning step of reading the print data stored in a memory and aligning the first line of the print data to a first end of a predetermined print area; a number of lines determining step of determining whether the print data includes plural lines; a second aligning step of aligning the last line of the print data to a second end when the print data is determined to include plural lines by the number of lines determining step; and a remaining line aligning step of aligning the remaining line between the first and second ends when the print data is determined to include more than three lines by the number of line determining step, the remaining line being line other than the first and last line.

In these embodiments, with plural print data, the first line is aligned in left alignment, the last line is aligned in right alignment, and the remaining line is aligned between the left and right ends. Consequently, lengthwise and crosswise movement of the plural data allows well-balanced alignment within a predetermined print area. Thereby an attractive and easy-to-read print result can be provided.

BRIEF DESCRIPTION OF THE DRAWINGS

Exemplary embodiments will be described below in detail with reference to the accompanying drawings in which.

DETAILED DESCRIPTION OF THE PREFERRED EMBODIMENTS

Exemplary embodiments will be described with reference to the accompanying drawings.

As an example of the "print data editing device" of the disclosure, a personal computer 2 connected to a printer 1 will be described. In the personal computer 2, the "print data editing program" of the disclosure is installed. First, the printer 1 and the personal computer 2 will be described with reference to FIG. 1 and FIG. 2.

Figure 1:
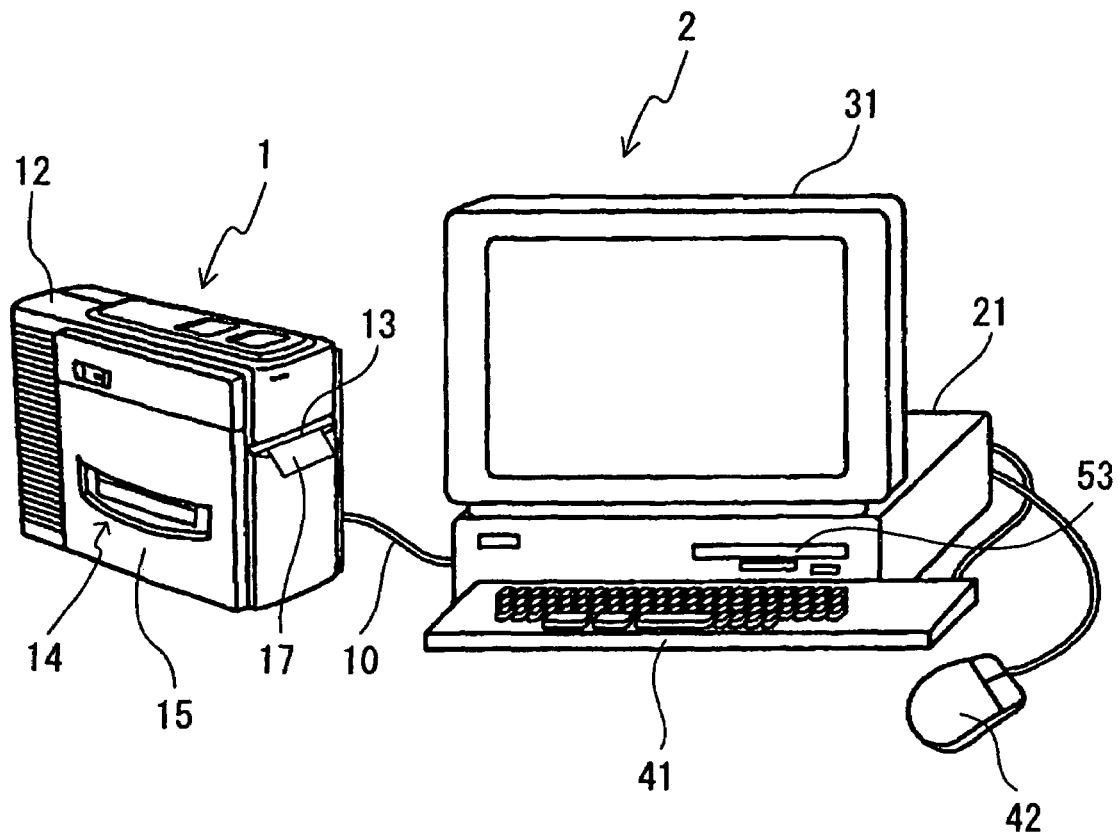
FIG. 1 is an external perspective view schematically showing a printer and personal computer.

As shown in FIG. 1, the personal computer 2 is connected to the printer 1 with, for example, a USB (universal serial bus) cable 10 based on the USB standard. Data is transmitted and received via the USB cable 10. The personal computer 2 is a conventional personal computer as known to those skilled in the art. As shown in FIG. 1, the personal computer 2 includes a main body 21 including a CPU 50, a monitor 31, a keyboard 41, and a mouse 42. The monitor 31, the keyboard 41 and the mouse 42 are respectively connected to the main body 21 with connecting cables. The personal computer 2 makes print data based on image data made by the installed software, "print data editing program" of the disclosure, thereby transmitting the generated print data to the printer 1.

Further, as shown in FIG. 1, the printer 1 is encased within the main body, which is typically a conventional substantially rectangular parallelepiped like. An exit slot 13 is provided on front of the main body 12 (right front face in FIG. 1) to discharge a tape 17. Inside of the left side face of the main body 12, a tape cassette compartment 14 is provided. A tape cassette can be detachably attached with a cover 15 provided on left side face of the main body 12 open. In the tape cassette compartment 14, a print mechanism is provided. The print mechanism includes a thermal head having plural heating elements and a platen roller. With the thermal head contacted to the platen roller, the tape 17 is fed between the thermal head and platen roller to be printed. The tape 17 of the attached tape cassette is printed with the print mechanism, is cut with the tape cutter of the print mechanism, and is discharged from the exit slot 13.

Figure 2:
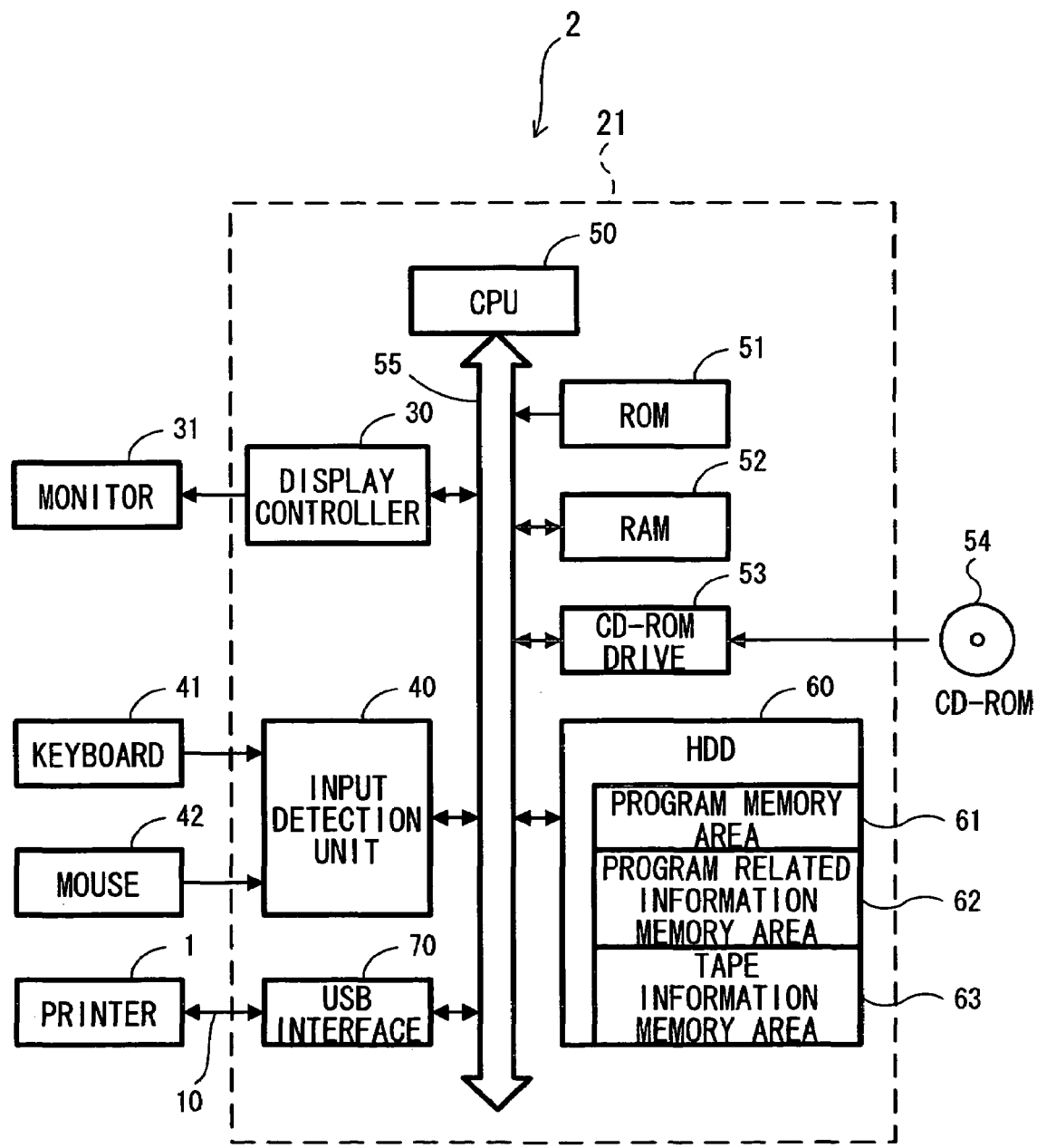
FIG. 2 is a block diagram showing the electrical structure of the personal computer.

The electrical and electronic structure of the conventional personal computer 2 will be described with reference to FIG. 2. As shown in FIG. 2, the personal computer 2 includes a CPU 50 for controlling the personal computer 2. A ROM 51, a RAM 52, a CD-ROM drive 53 and an HDD 60 are connected to the CPU 50 via BUS 55. The ROM 51 stores BIOS etc. which the CPU 50 executes. The RAM 52 temporarily stores data. The CD-ROM drive 53 reads data with CD-ROM 54 (recording medium) inserted. The HDD 60 is a data storage device.

The HDD 60 includes a program memory area 61, a program related information area 62 and a tape information memory area 63. The program memory area 61 stores various kinds of program (e.g. print data editing program) executed in the personal computer 2. The program related information area 62 stores settings, initial values, and data etc. required for executing program. The tape information memory area 63 stores information related to tapes used in the printer 1.

Further, a USB interface 70, a display controller 30, and an input detection unit 40 are connected to the CPU 50 via the BUS 55. The USB interface 70 communicates with peripheral devices including the printer 1. The display controller 30 controls the display of the monitor 31 for displaying operation screen for a user. The keyboard 41 and mouse 42 are connected to the input detection unit 40. The input detection unit 40 detects inputs operated by the user. Moreover, the personal computer 2 may be provided with a floppy disk drive, I/O for audio etc. and various kinds of interface etc.

Furthermore, the CD-ROM 54 stores software including the print data editing program. Similarly, the CD-ROM 54 stores settings and data etc. used for executing the program.

The software, settings and data etc. are stored on the CD-ROM 54 and communicated to the program memory area 61 and the program related information area 62 provided with the HDD 60. Moreover, the obtaining method of the print data editing program and the required data etc. for the personal computer 2 is not limited to the CD-ROM 54. The method may be practiced with other recording medium, such as a floppy disk or an MO (Magneto-Optical disk), as would be known to those skilled in the art after review of this disclosure. Further, with the personal computer 2 connected to network, the data may be obtained from another computer on the network.

The process for alignment in the print data editing device with the above-described structure will be described with reference to FIGS. 3-13.

Figure 3:
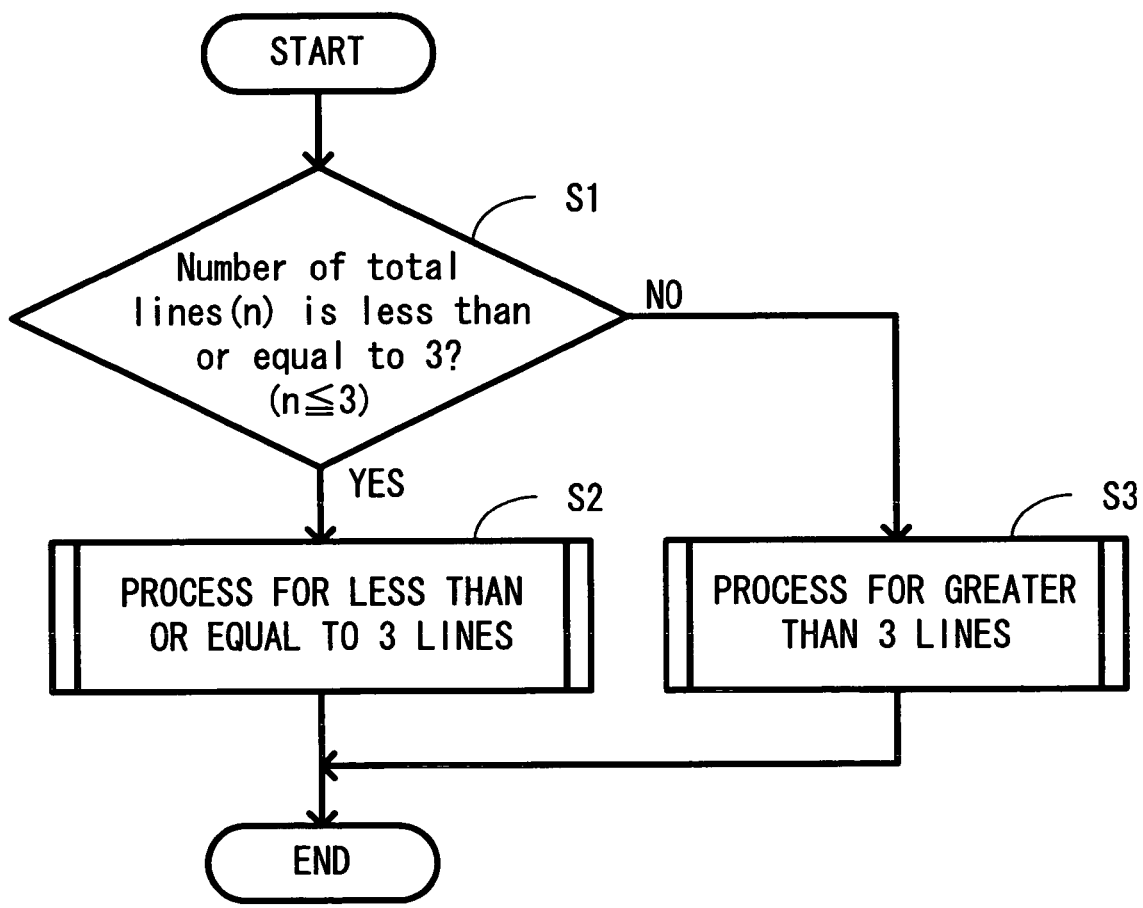
FIG. 3 is a flowchart of a main routine for print data editing process.

As shown in FIG. 3, the process for print data editing starts by counting the total lines of inputted data for alignment in order to determine whether the counted number of lines is less than three (S1). The counting of the total lines can be carried out by a well-known way such as counting line feed code included in the inputted data. When the total number of lines is less than or equal to three lines(S1: YES), the process for less than or equal to three lines as a simple process is executed (S3). After the process of S2 and S3, the process is completed.

The process for less than or equal to 3 lines executed in S2 of FIG. 3 will be described with reference to FIG. 4. The print data editing device of the disclosure aligns as follows. When the inputted data includes plural lines, the first line is aligned to the left end and last line is aligned to the right end. Further, the line between the first and last line is aligned on a straight line connecting the center of the first line and the last line. With such alignment, with the total number of lines from one to three lines, the process for less than or equal to three lines is adopted because a particularly complicated calculation is not required. Consequently, even with the inputted data less than three lines, the process for less than or equal to three lines is not limited.

Figure 4:
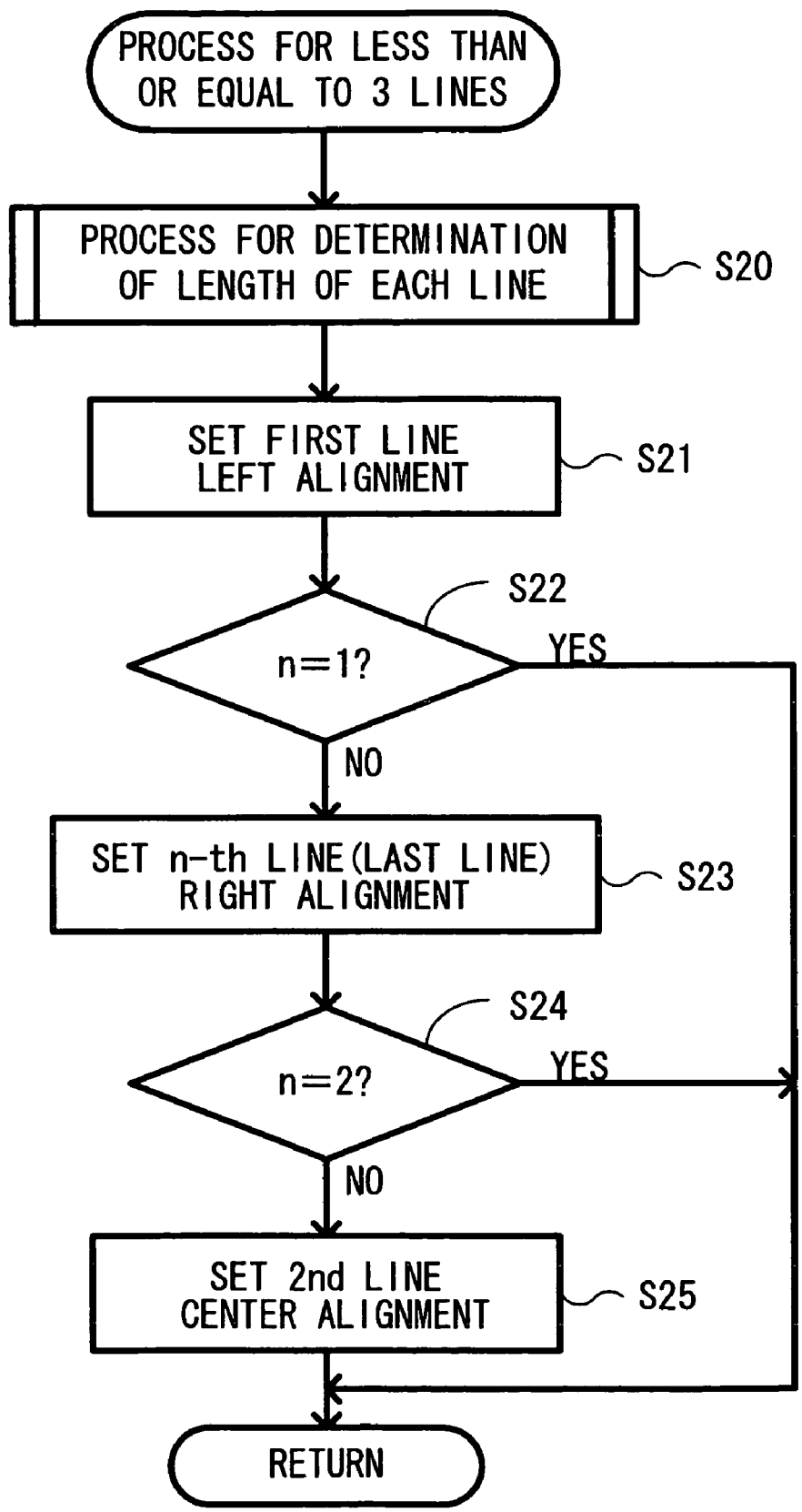
FIG. 4 is a flowchart of process for less than or equal to 3 lines executed in the print data editing process.

In the process for less than or equal to three lines, as shown in FIG. 4, the process for determination length on each line is executed (S20). In this embodiment, the first line is aligned in left alignment, the last line is aligned in right alignment, and the intermediate line is aligned between them, thereby providing well-balanced alignment. However, the intermediate line may protrude depending on length of the each line. To avoid such protrusion, S20 first checks whether the length of one line of the inputted data is longer than that of the area to be printed. Moreover, the process may be omitted because the process is not always required for realization of the disclosure. The detail of the process for determination of length on each line in S20 will be described later with reference to FIG. 6.

The inputted data on first line is set to left alignment (S21). Whether the total number of lines is one line is determined (S22). When the total number of lines is one line (S22:YES), the set left alignment remains and the process is completed to return to main routine. Moreover, when the inputted data is only one line, the alignment is not limited to the left alignment. For example, the alignment may be set to centering.

Figure 8:
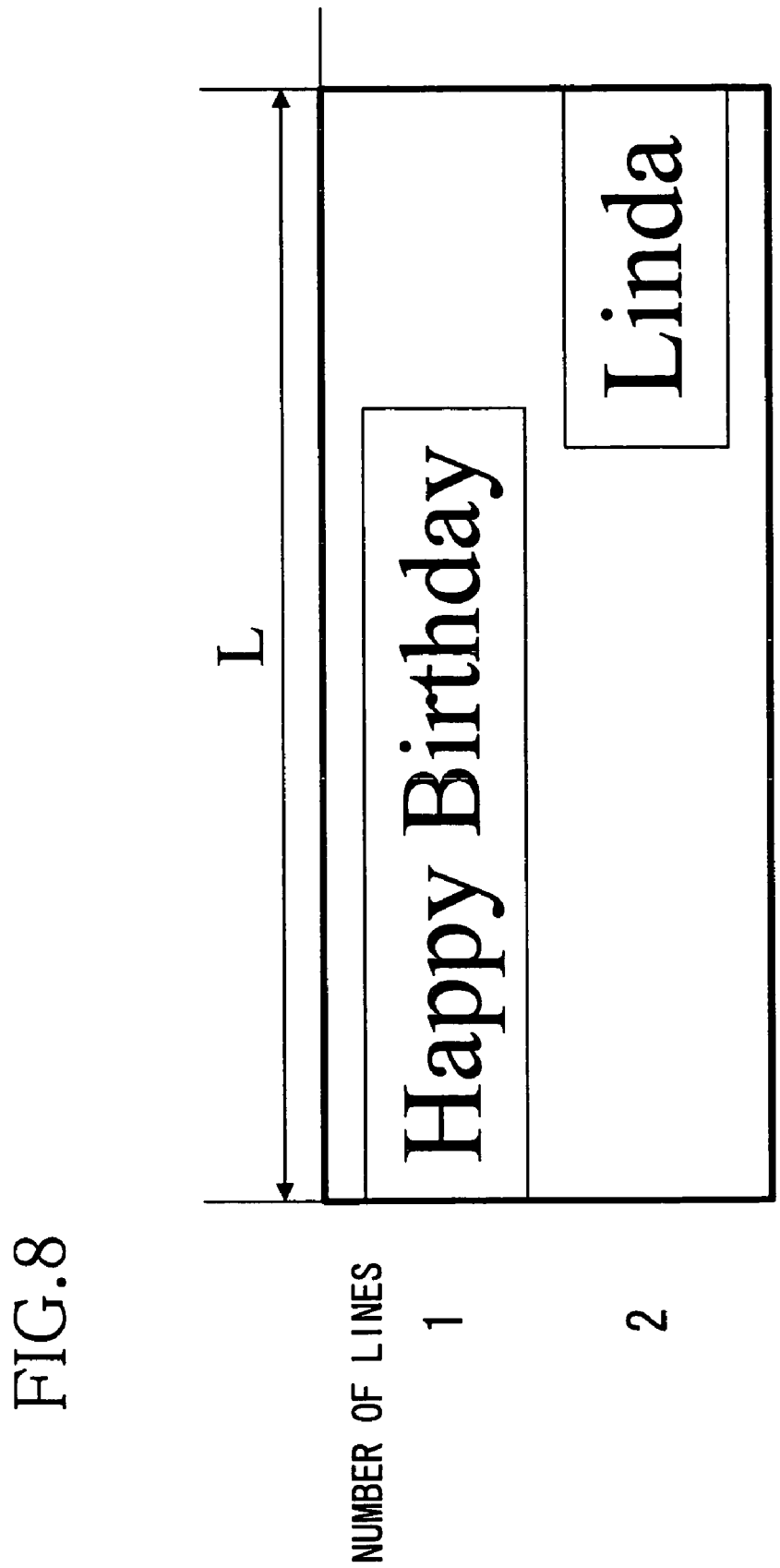
FIG. 8 is an explanatory diagram showing an example of the alignment in the case input data includes 2 lines.

When the total number of lines is not one line (S22:NO), the last line is set to right alignment (S23). Whether the total number of lines is two lines is determined (S24). When the total number of lines is two lines (S24:YES), the process is completed with the first line left alignment and last line right alignment as shown in FIG. 8. The process then returns to the main routine. FIG. 8 shows an example of alignment by the present embodiment of inputted data with "Happy Birthday" on the first line and "Linda" on the second line. The left end on the first line is aligned to the left end in the print area and the tail on the second line is aligned to the right end in the print area. In the present embodiment, the alignment only in the x direction is referred and alignment in the y direction is aligned based on a predetermined amount of the line feed. Moreover, the alignment in y direction may be set to centering for the print area as other embodiment.

Figure 9:
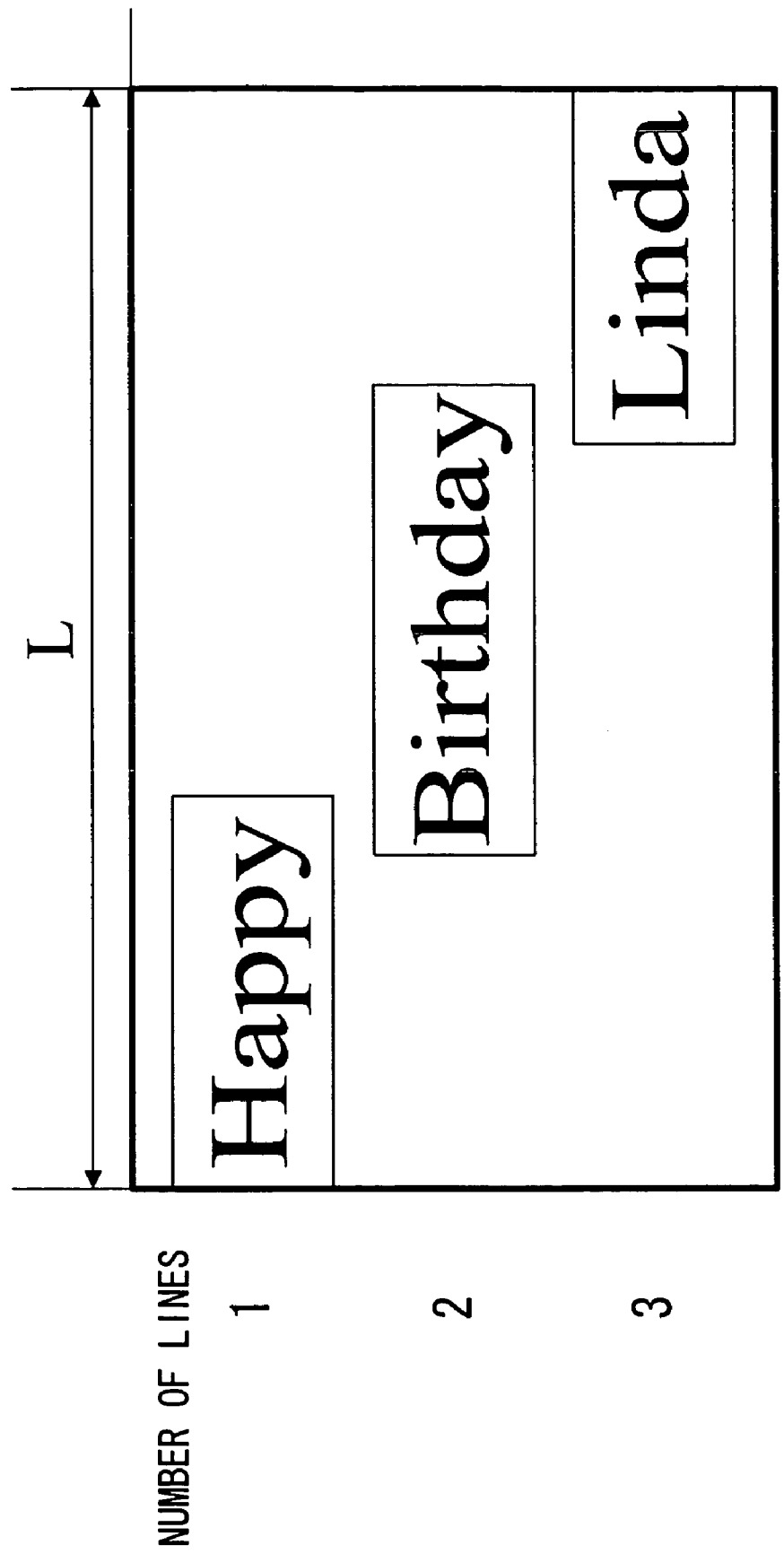
FIG. 9 is an explanatory diagram showing an example of the alignment in the case input data includes 3 lines.

When the total number of lines is not two lines (S24:NO), the total number of lines is three lines. Because the first line is set to the left alignment (S21) and third line is set to the right alignment (S23) by the foregoing process, the second line is set to centering (S25). After that, the process is completed to return to the main routine. Such process aligns the three lines as shown in FIG. 9. With the inputted data "Happy" on the first line, "Birthday" on the second line and "Linda" on the third line, the left end of the first line is aligned to the left end of the print area, the tail of the third line (last line) is aligned to the right end of the print area, and the second line is aligned to the centering. This results in well-balanced alignment in the first through third lines right downward in order so that the user can read the print result with his or her eyes moving rightwardly and downwardly. Consequently, such alignment allows the user to obtain attractive and easy-to-read alignment particularly when the user wants to use the print result for a title.

Figure 5:
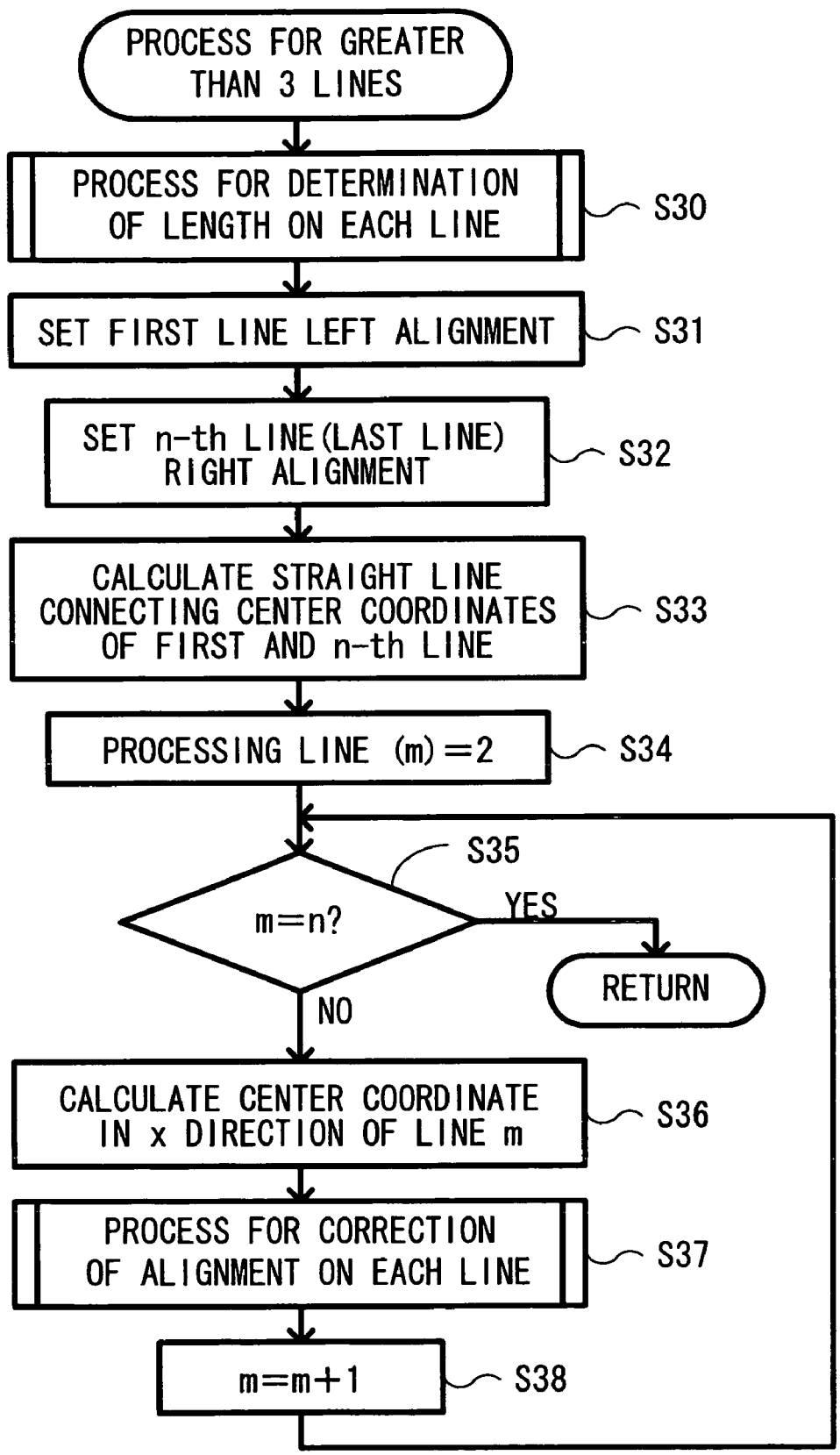
FIG. 5 is a flowchart of process for more than 3 lines executed in the print data editing process.

The process executed in S3 of FIG. 3 will be described with reference to FIG. 5. The process for determination of the length on each line is firstly executed (S30). In the present embodiment, as described above, the first line is aligned in the left alignment, the last line is aligned in the right alignment, and the intermediate line is aligned in-between. In particular, as will be described later, center coordinate of the intermediate line is aligned on a straight line connecting each center coordinate of the first line and last line, thereby trying to provide well-balanced alignment. However, such alignment may result in protrusion on some line depending on the length of each line. There are some ways to avoid this protrusion. Firstly, whether the length of one line of the inputted data is longer than that of the area to be printed is determined. Detail of the process for determination of length on each line in S30 will be described later with reference to FIG. 6.

After the process for determination of the length, the first line is set to left alignment (S31). The last line is then set to right alignment (S32). Center coordinates of the first line set in S31 and last line set in S32 are obtained to calculate a straight line connecting both coordinates (S33).

In S33, the length (L) of target print medium (label, tape etc.) in x direction is obtained to determine whether both lengths of the first line and last line are L. When the length of both lines is L, both center coordinates in x direction of the first line and last line are ½ L. Hence, a straight line connecting both the coordinates is parallel to y axis. Consequently, the calculated straight line in x direction is given by equation x=L/2.

On the other hand, when the lengths of both lines are not equal to L, the equation expressing the straight line is given by y=ax+b. Consequently, from two points on the straight line, $(x_1, y_1)$ and $(x_n, y_n)$, gradient a and ordinates' intersection b are given by the following equations:

$$a=(y_n-y_1)/(x_n-x_1)$$

$$b=y_1-ax_1$$

The second line is then processed (m=2) (S34) to determine whether the processed line is the last line (n) (S35). When the processed line is the last line (S35:YES), the process is completed to return the main routine.

When the processed line is not yet the last line (S35:NO), the center coordinate in x direction of the processing line is calculated so as to be on the straight line calculated in S33. In the case that equation of the straight line calculated in S33 is x=L/2 (parallel to y axis), the center coordinate in x direction is given by $x_m$=L/2. In other cases, the center coordinate in x direction is given by the following equation:

$$x_m=(y_m-b)/a$$

When the relationship between the line length and location in the y direction results in the protrusion of the line aligned in the above-described way, realignment (the process for correction of alignment on each line) is executed (S37). In the same way as the foregoing process for determination of length (S30), the process for correction of alignment may be omitted because the process is not always required for the disclosure. Details of the process for correction of alignment on each line will be described later with reference to FIG. 7.

The processed line is then shifted to the following line by one line (S38) to repeat the following step S35 to S38 until the processed line is the last line.

Figure 6:
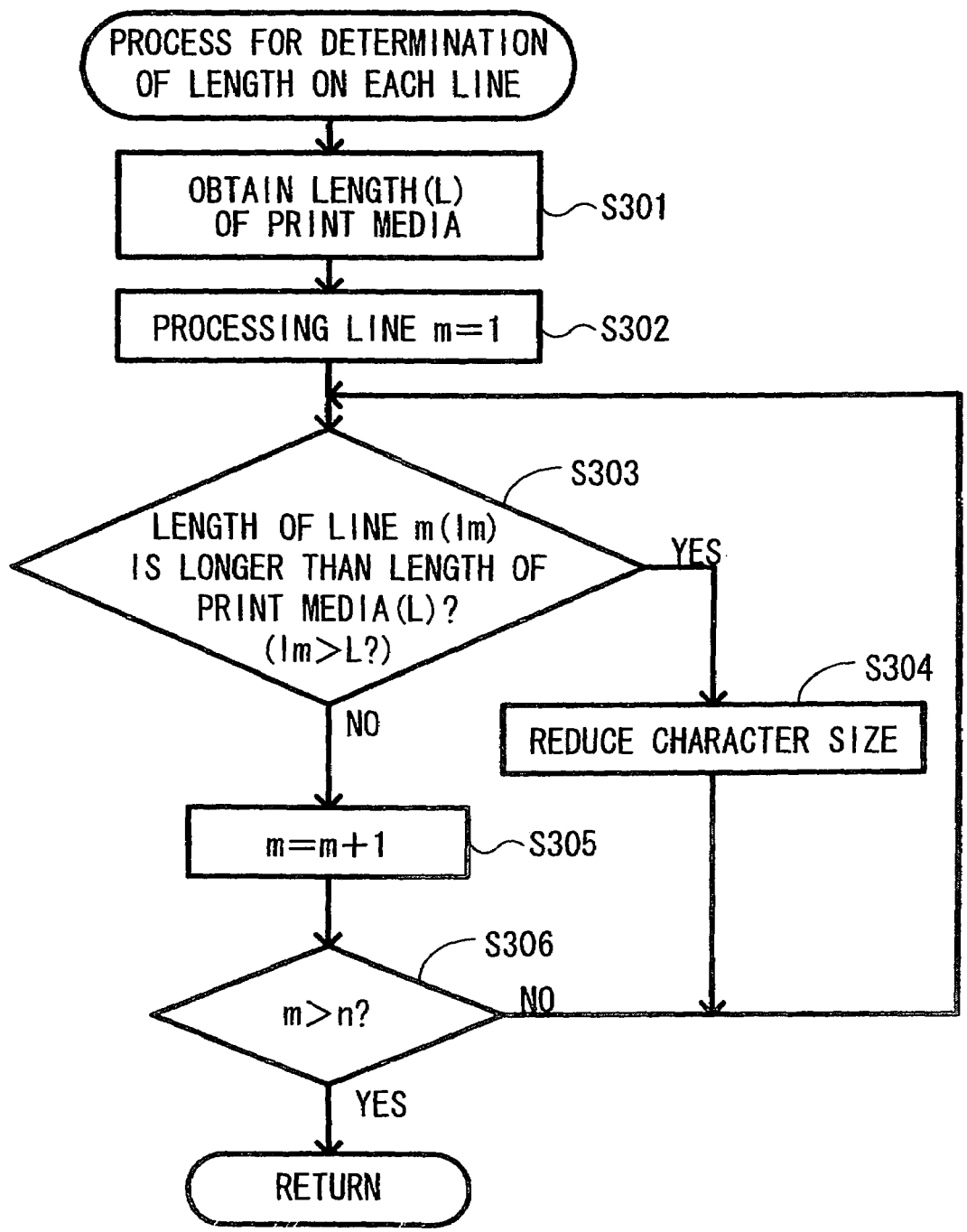
FIG. 6 is a flowchart of process for determination of length on each line executed in the process for more than 3 lines.

The process for determination of the length of each line executed in S20 of FIG. 4 and S30 of FIG. 5 will be described with reference to FIG. 6. Length (L) in the x direction of the print medium to be printed (label, tape etc.) is obtained (S301). Here, the print area is predetermined. The processed line (m) is then set to the first line to start (S302).

Whether the length of the processed line ($l_m$) is longer than that of the print area (L) obtained in S301 (S303) is determined. When the length of the line is within that of the print medium (S303:NO), the process proceeds to S305 because a particular process is not required. When the length of the line is longer than that of the print medium (S303:YES), the process for reduction of the character size is executed to reduce the size of each character within the processed line by one level (S304). The process then returns to S303 to recheck whether the length of the line is longer than that of the print medium. The reduction of character size is executed (S303:NO) until the length of the processing line is within that of the print medium (S304).

Moreover, when the character size reduction to the limitation of ready-made fonts makes it impossible to put the length of the line within that of the print medium, printing may performed with the character beyond the print area being not printed. Further, informing the user of error may allow the user to reduce the number of the characters and/or change the length of the print medium.

When the length of the line is within that of the print medium (S303:YES), the processed line is shifted to next line (S305) to determine whether the last line is processed (S306). When the processing of the last line is finished (S306:YES), the process returns to the main routine. When the process is not executed until the last line (S306:NO), S303 to S305 are repeated. When the total of the inputted data string is over the length of the specified print area, the process for determination of the length of each line makes it possible to reduce the character size in advance, thereby obtaining a well-balanced more attractive print result.

Figure 7:
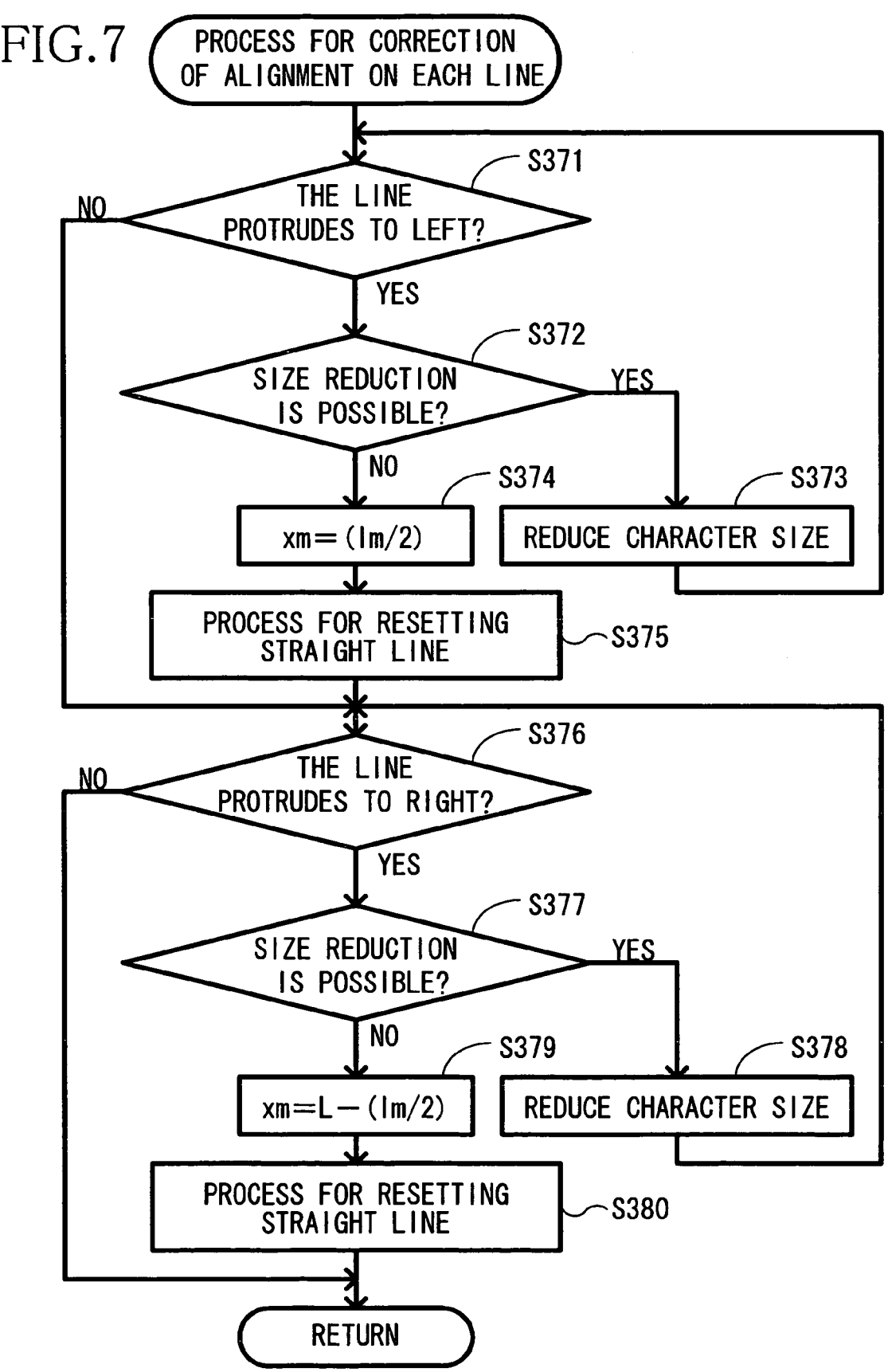
FIG. 7 is a flowchart of process for correction of alignment on each line executed in the process for more than 3 lines.

The process for correction of alignment on each line, which is executed in S37 of FIG. 5, will be described with reference to FIG. 7. Whether line being currently processed, m, protrudes to the left out of the print area is determined (S371). Specifically, whether the following equation is met is determined:

$$x_m-(l_m/2)<0$$

Figure 10:
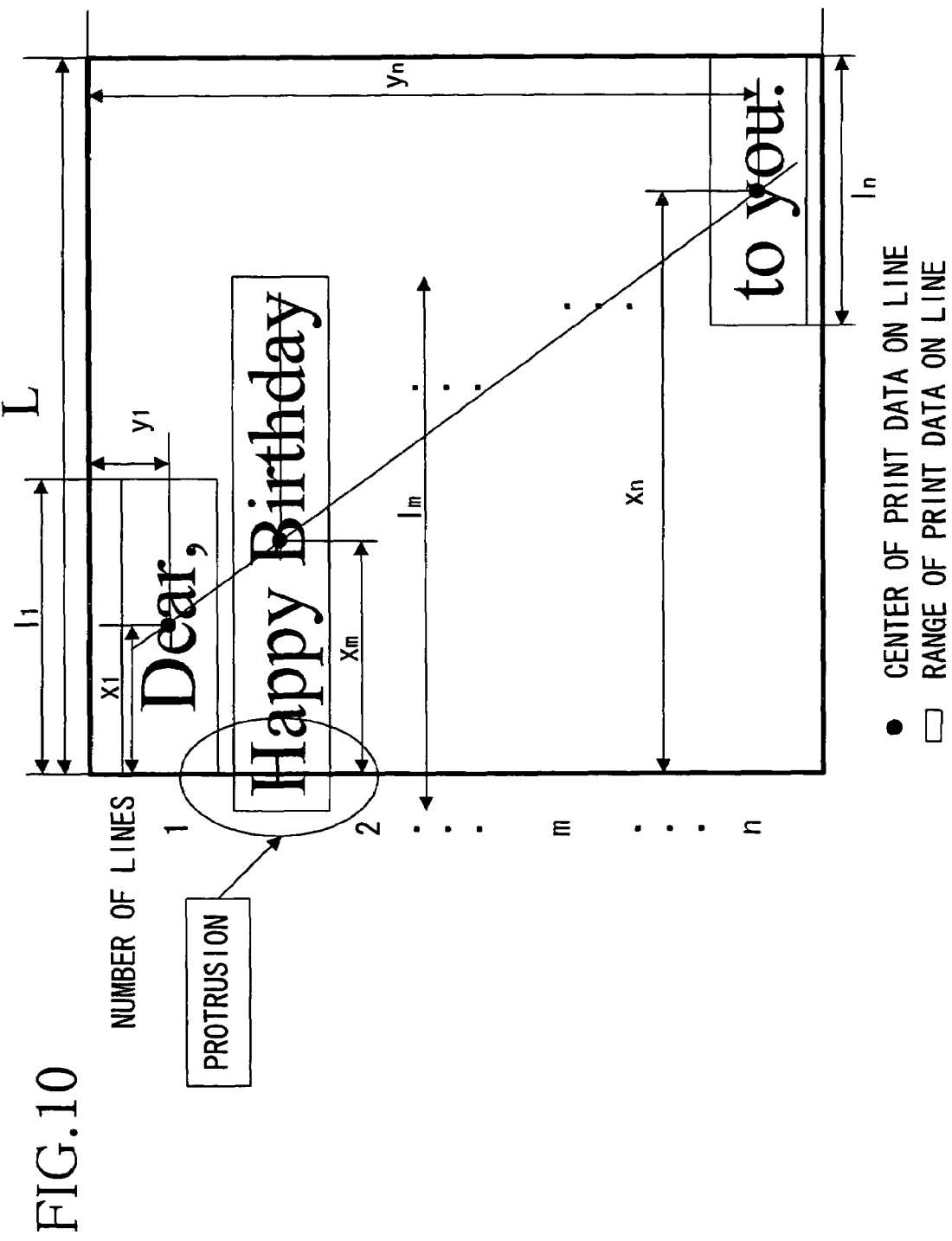
FIG. 10 is an explanatory diagram showing an example of the alignment in the case input data includes more than 3 lines.

Suppose the line being currently processed, m, is aligned in the left alignment. When the center x coordinate (calculated in S36 of FIG. 5) is located to the left rather than the center of the line m (S371:YES), the line protrudes to the left as shown in FIG. 10, for example. FIG. 10 shows that the center coordinate $x_m$ of "Happy Birthday" on the second line is located to the left rather than ½ $l_m$ (not shown), which is a half of location of length of whole "Happy Birthday".

Upon printing in this state, the left side, which is beyond the print area is not printed. To avoid which, with the size reduction available, the reduction is executed. With the size reduction not available, movement is performed. Firstly, whether the size reduction is available is determined (S372). When the size reduction is available (S372:YES), the size reduction is executed to reduce the size of each character within the line by one level (S373). The process then returns to S371 to recheck whether the line protrudes to the left side using $l_m$ (length of the line in reduced size). Moreover, after the character size reduction in S373, the center coordinate in x direction of the line may be recalculated by the same process as that in S36 of FIG. 6, the process may return to S371.

The character size reduction is limited to the ready-made fonts. Consequently, when the character size reduction cannot be carried out (S372:NO), the center x coordinate of the line is set to a half of the length of the line (S374). The process for resetting of the straight line is then executed so that the reset straight line connects the set center x coordinate (S375): The straight line is recalculated by the center coordinates of the line m being currently processed and the last line n. In the case that the center coordinates of the line m and the last line n are the same, the recalculated straight line is parallel to the y axis. In other cases, the gradient a and ordinates' intersection b are recalculated. The center coordinate is then calculated in S36 of FIG. 5 for the following line based on the given equations, thereby preventing the protruding line from aligning with the protrusion. Further, the following lines can be smoothly aligned. Moreover, the process for reset (S375) may be omitted because the process is not always required for the realization of the disclosure.

Whether the line being currently processed, m, protrudes out of the print area is determined (S376). Specifically, whether the following equation is met is determined:

$$x_m + (l_m/2) > L$$

Figure 11:
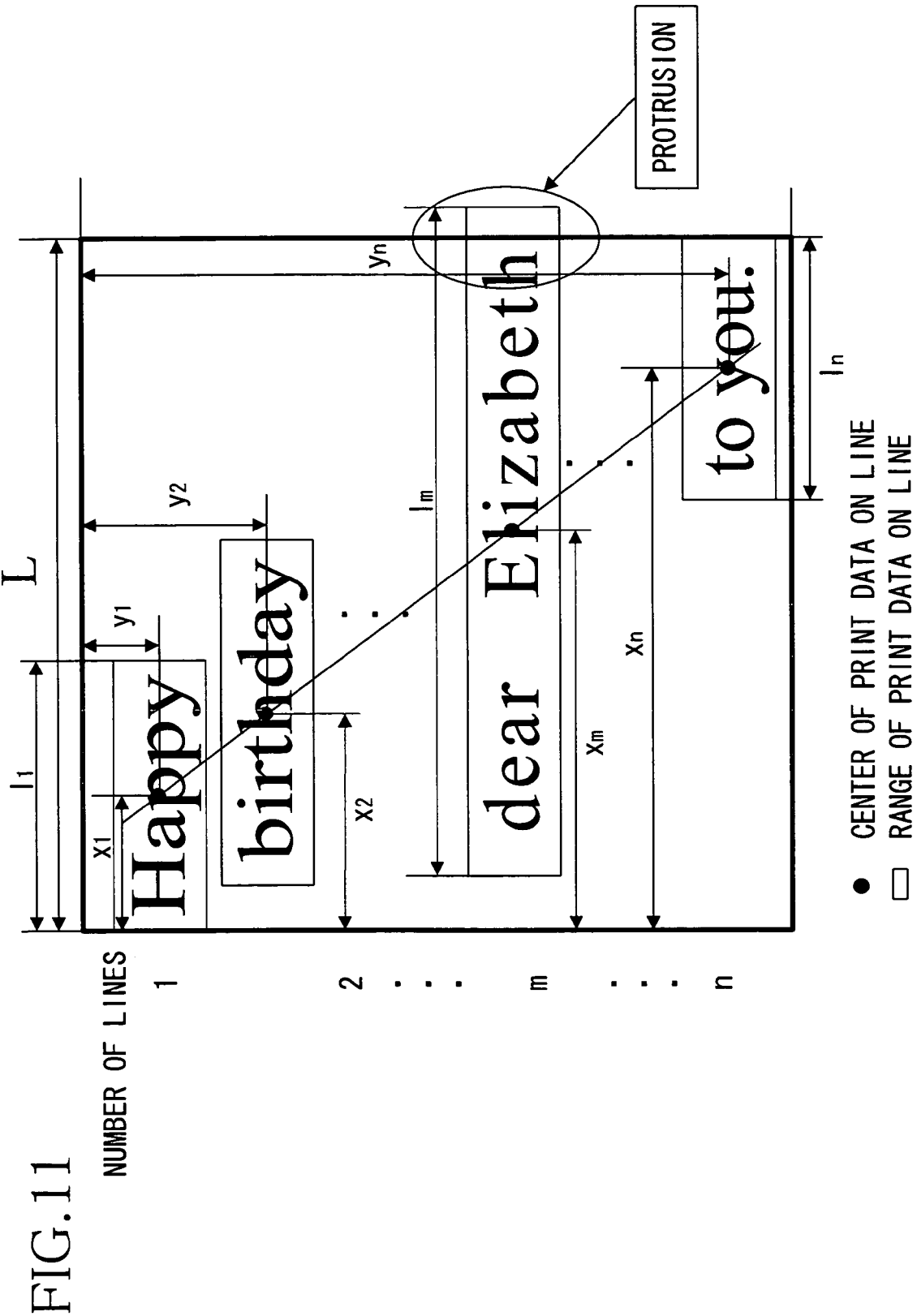
FIG. 11 is another explanatory diagram showing an example of the alignment in the case input data includes more than 3 lines.

When the center x coordinate plus a half of the length of the line m ($l_m$) is beyond the right end of the print area (S376:YES), the line protrudes to the right, for example, as shown in FIG. 11. FIG. 11 shows that the center coordinate $x_m$ of "dear Elizabeth" on the line m plus a half of the line length of "dear Elizabeth" is beyond L.

Figure 12:
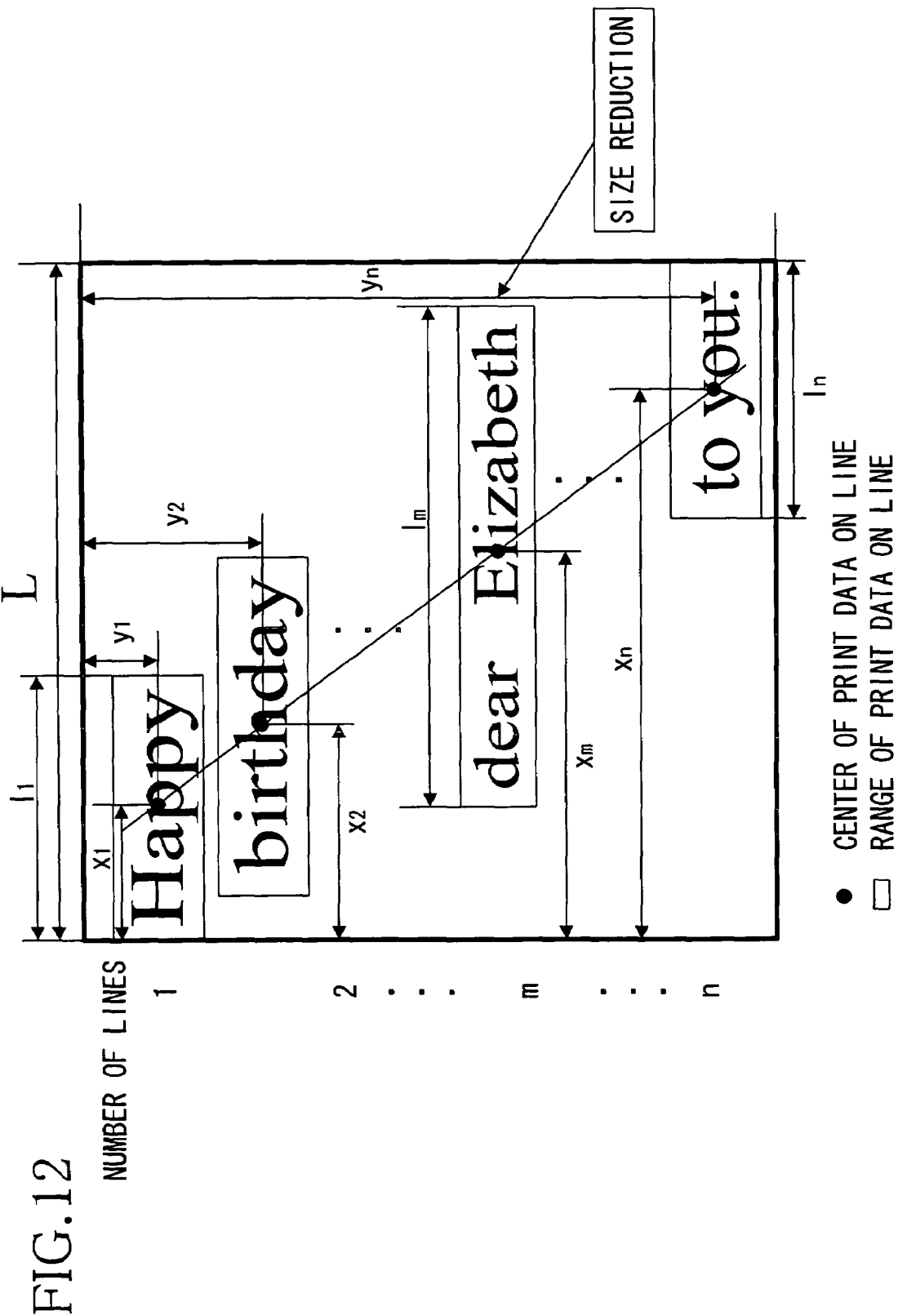
FIG. 12 is an explanatory diagram showing an example of the alignment reduced size in the case input data includes more then 3 lines.

Upon printing in this state, the right side which is the character beyond the print area is not printed. To avoid this, with the size reduction available, the reduction is executed. With the size reduction not available, movement is performed. Firstly, whether the size reduction is available is determined (S377). When the size reduction is available (S377:YES), the size reduction is executed to reduce the size of each character within the line by one level (S378). As shown in FIG. 12, the size reduction results in eliminating the protrusion to the right. The process then returns to S376 to recheck whether the line protrudes to the left side using $l_m$ (length of the line in reduced size). Moreover, after the character size reduction in S378, the center coordinate in the x direction of the line may be recalculated by the same process as that in S36 of FIG. 6, the process may return to S376.

Figure 13:
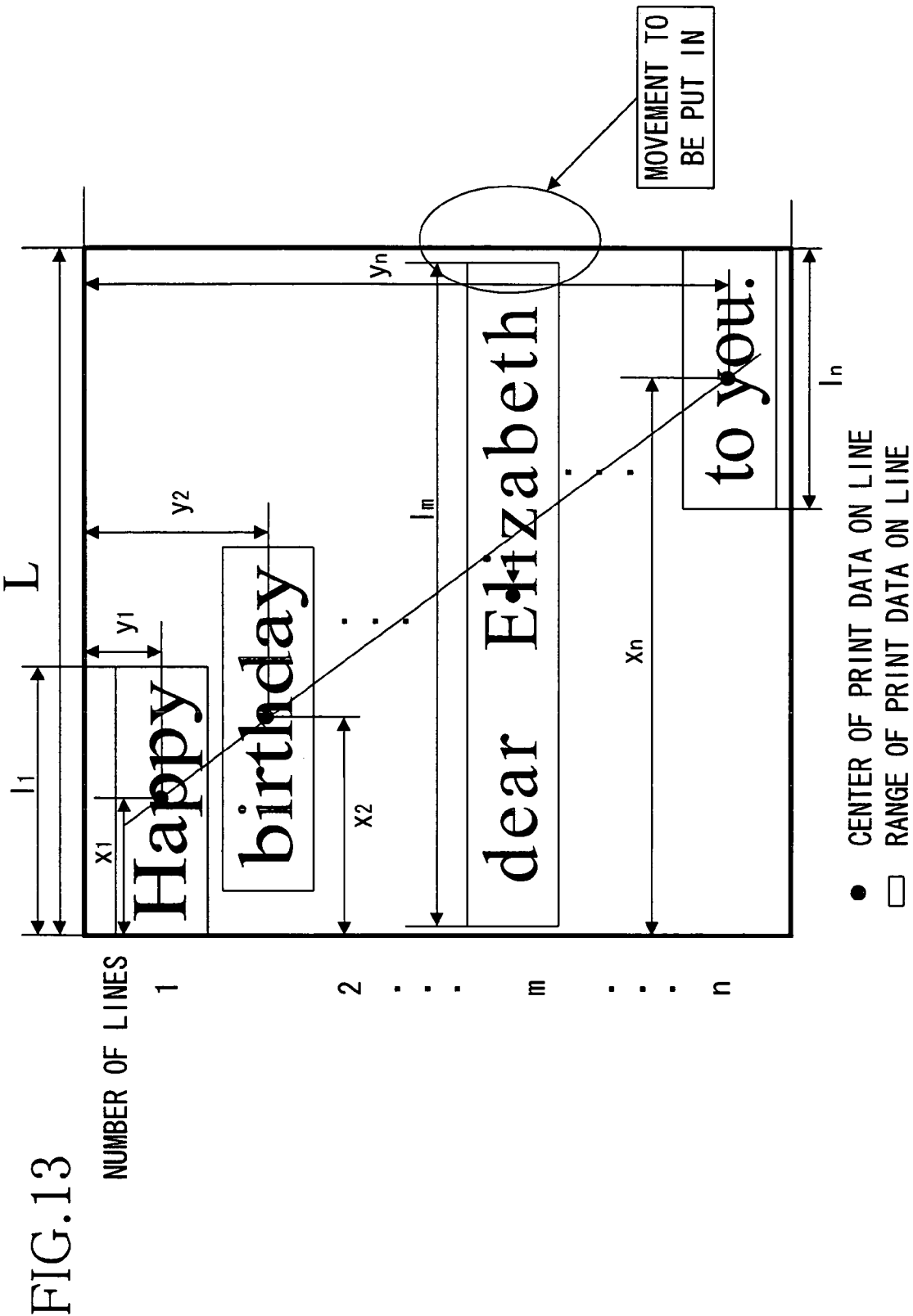
FIG. 13 is an explanatory diagram showing an example of the realignment in the case input data includes more than 3 lines.
Figure 14:
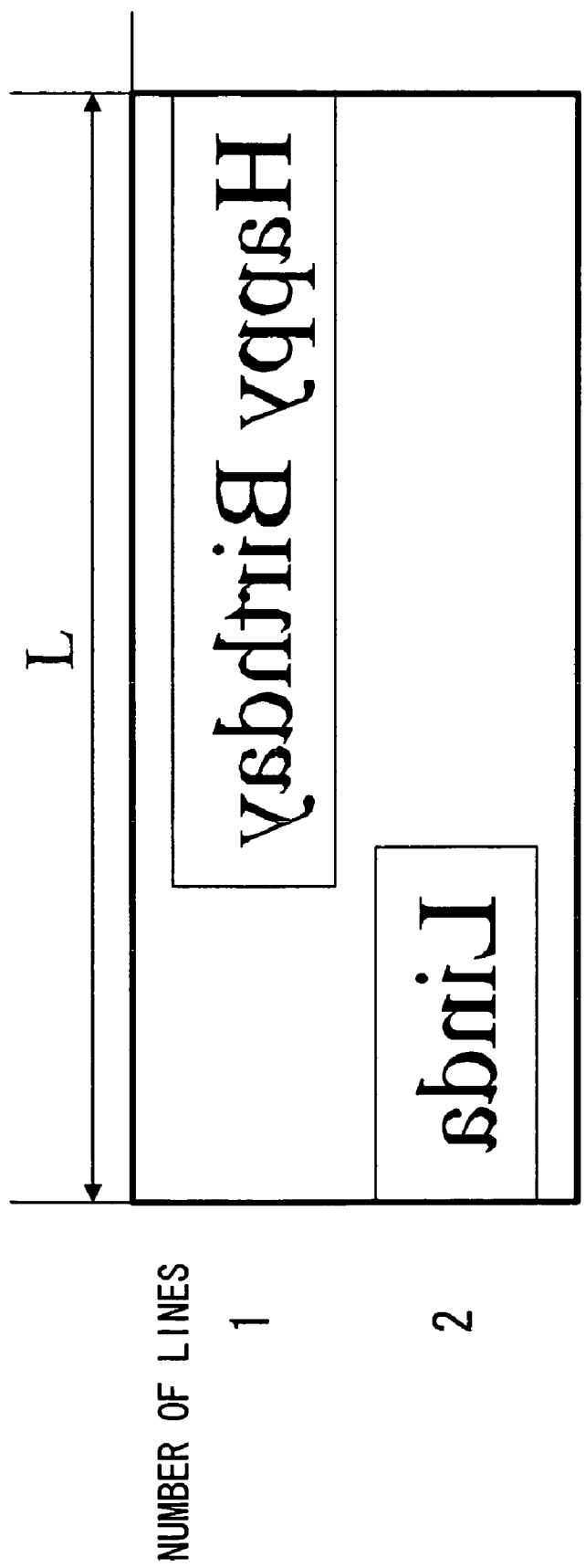
FIG. 14 is an explanatory diagram showing an example of the alignment in the case input data includes 2 lines in the second embodiment.
Figure 15:
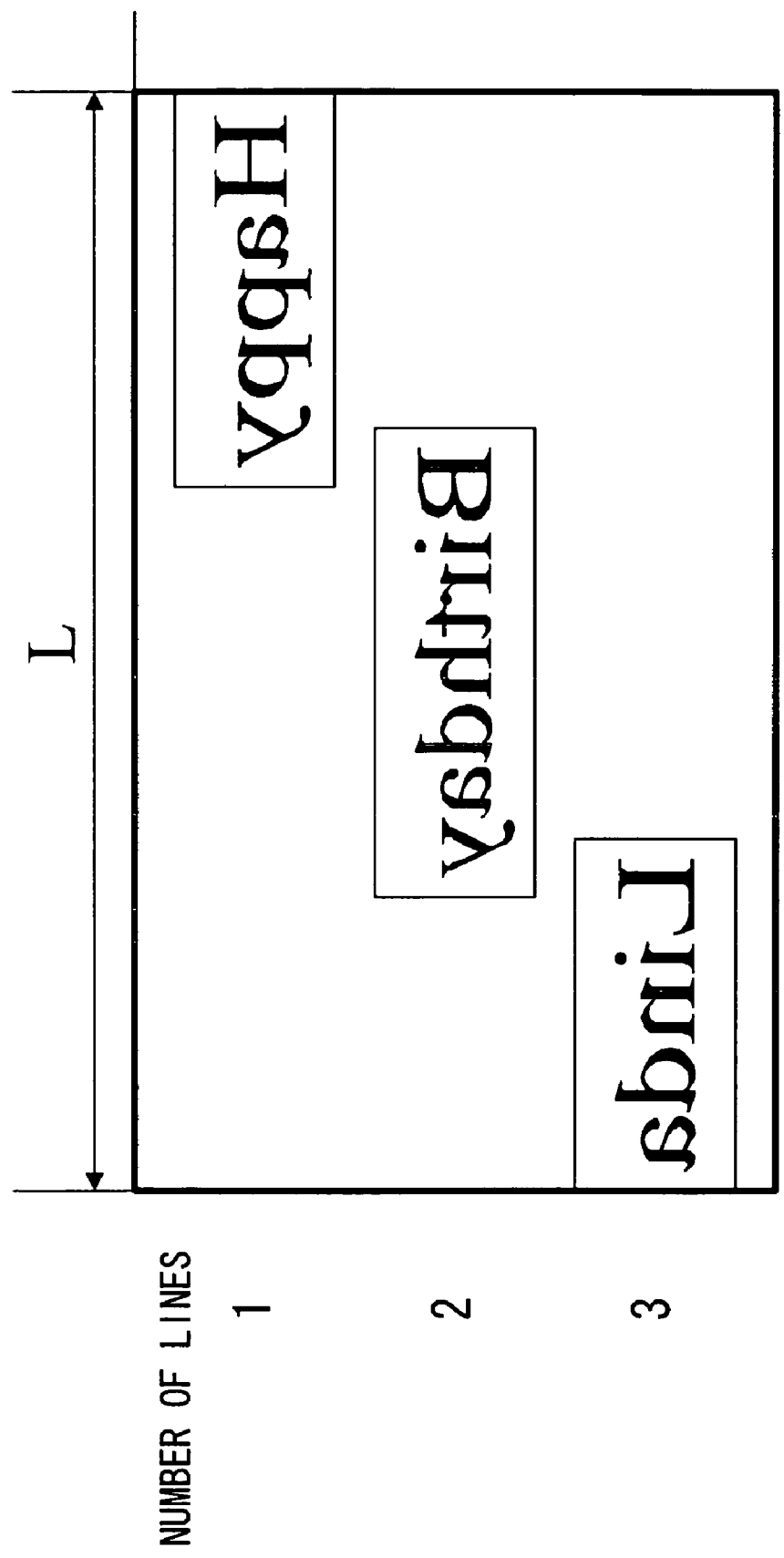
FIG. 15 is an explanatory diagram showing an example of the alignment in the case input data includes 3 lines in the second embodiment.
Figure 16:
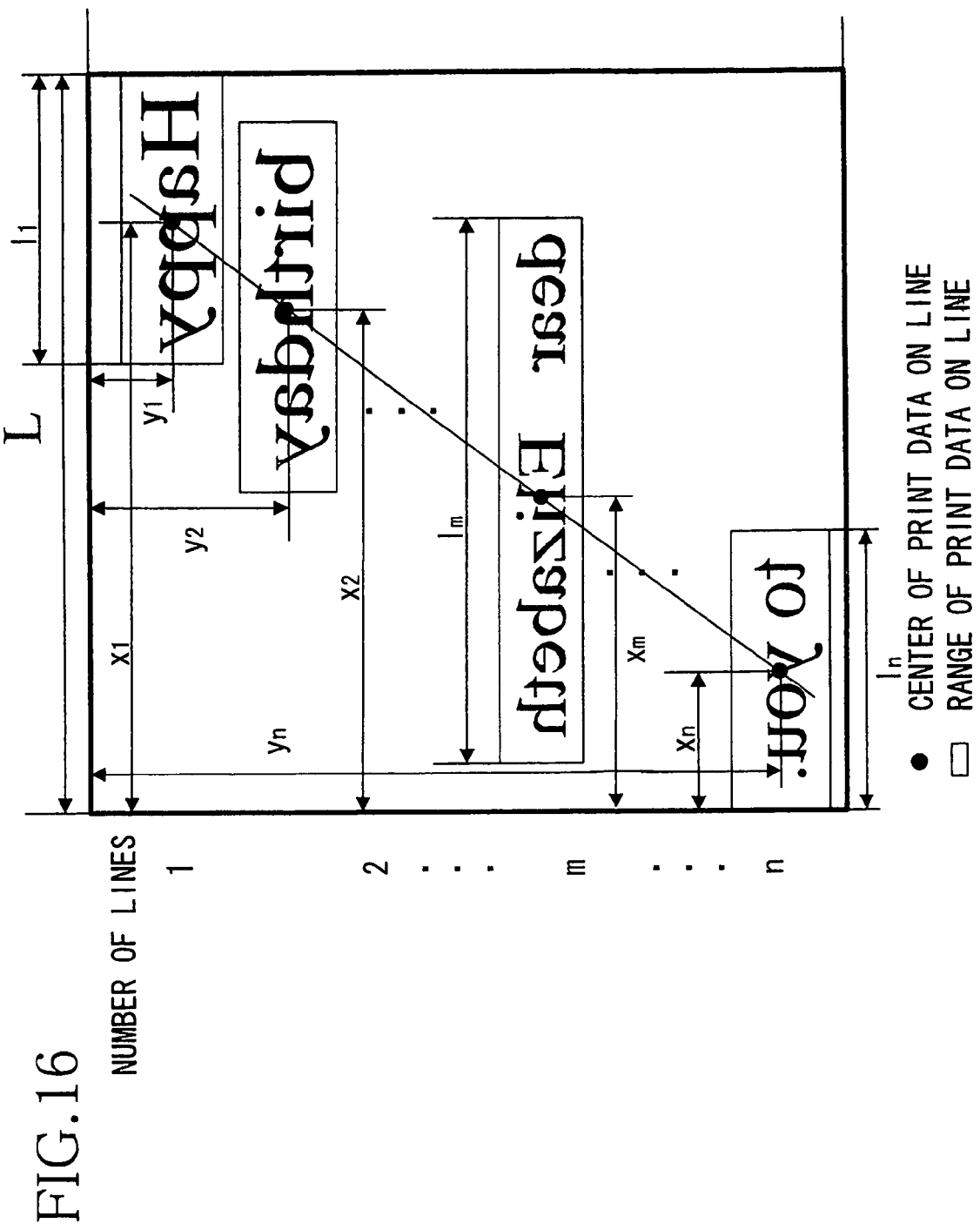
FIG. 16 is an explanatory diagram showing an example of the alignment reduced size in the case input data includes more then 3 lines in the second embodiment.
Figure 17:
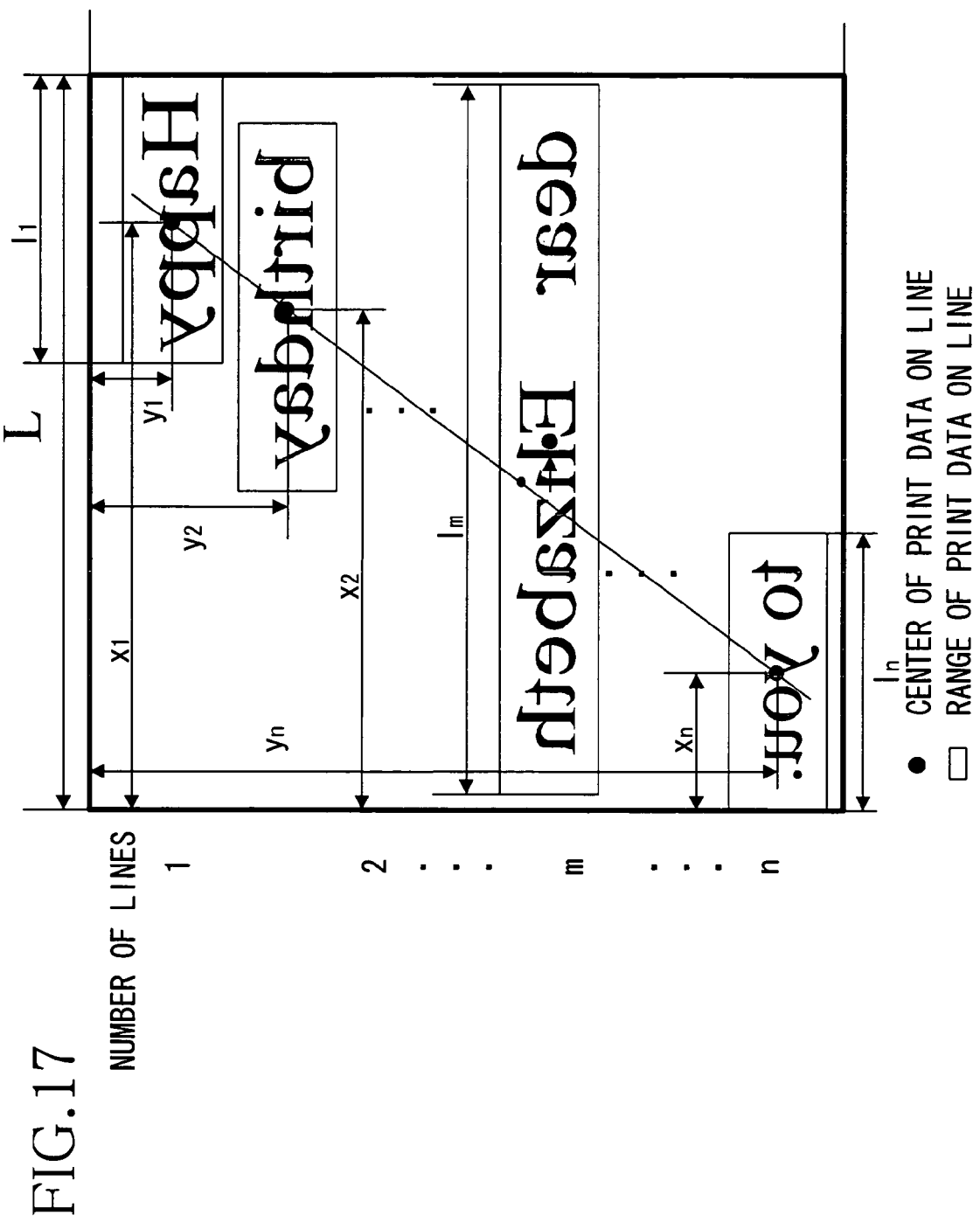
FIG. 17 is an explanatory diagram showing an example of the realignment in the case input data includes more than 3 lines in the second embodiment.

The character size reduction is limited to the ready-made fonts. Consequently, when the character size reduction cannot be carried out (S372:NO), the center x coordinate of the line is set to the print area length L minus a half of the length of the line (S379). Such alignment results in eliminating the protrusion to the right as shown in FIG. 13.

The process for resetting the straight line is then executed so that the reset straight line connects the set center x coordinate (S380) as follows: The straight line is recalculated by the center coordinates of line m being currently processed and the last line n. In the case that the center coordinates of the line m and the last line n are the same, the recalculated straight line is parallel to the y axis. In other cases, the gradient a and ordinates' intersection b are recalculated. The center coordinate is then calculated in S36 of FIG. 5 for the following line based on the given equations. This calculation prevents only the protruding line from aligning with protrusion. Further, the following lines can be smoothly aligned. Moreover, the process for resetting (S380) may be omitted because the process is not always required for this embodiment.

As described above, with the print data editing device of the present embodiment, the first line is aligned in left alignment, the last line is aligned in right alignment and the center coordinate of the remaining line is aligned on a straight line connecting the center coordinates of the first and last line. Consequently, lengthwise and crosswise well-balanced character alignment can be provided. This alignment can be suitably used particularly when the user wants to make labels for a title.

In the resulting print data editing device, with plural print data, the first line is aligned in left alignment, the last line is aligned in right alignment, and the remaining line is aligned between left and right end. Consequently, lengthwise and crosswise movement of the plural data allows well-balanced alignment within a predetermined print area. Thereby an attractive and easy-to-read print result can be provided.

Further, the remaining line other than the first line and last line is aligned not only in centering. Additionally, the center coordinate of each line is aligned on a straight line connecting the center coordinates of the first and last lines. Consequently, the each line is laterally well-balanced aligned. Thereby a more attractive and easy-to-read print result can be provided.

Further, when length of the print data is longer that of the print area, the characters of the print data is reduced in advance of the alignment to be put in the print area. Consequently, a desired print result can be provided without the characters being omitted.

Further, in the case that the remaining line is aligned along the straight line of the center coordinates, the remaining line may protrude either left or right depending on the length and location. In such a case, the character is reduced to be put in the print area. Consequently, a desired print result can be provided without the character being omitted.

Further, in the case that the remaining line is aligned along the straight line of the center coordinates, the remaining line may protrude either left or right depending on the length and location. In such a case, the print data range is moved to be put in the print area. Consequently, a desired print result can be provided without the character being omitted.

Further, the movement recalculates to align the following line based on the location of the movement. Consequently, a desired print result can be provided without the only moved line protruding.

Making the computer execute the print data editing program allows taking advantage of the various kinds of process means of the print data editing device.

Making the computer read the recording medium allows taking advantage of the various kinds of process means of the print data editing program.

The second embodiment in which the above embodiment is partially changed, will be described below.

The first line may be aligned in right alignment and the last line may be aligned in left alignment as the second embodiment. FIGS. 14-17 are explanatory diagrams showing examples of the alignment in the second embodiment. According to the second embodiment, the first line is aligned in right alignment, the last line is aligned in left alignment and the center coordinate of the remaining line is aligned on straight line connecting center coordinates of the first and last line. Consequently, lengthwise and crosswise well-balanced character alignment can be provided. Moreover, print data such as characters, figures and symbols may be converted in mirror image as shown in FIGS. 14-17. Such conversion can be suitably used particularly when the user wants to make labels which can be seen in right image by people outside. That is, for example, when print data is printed on a transparent tape to adhered the printed transparent tape inside of a window of a car or a display of a department store.

Figure 18:
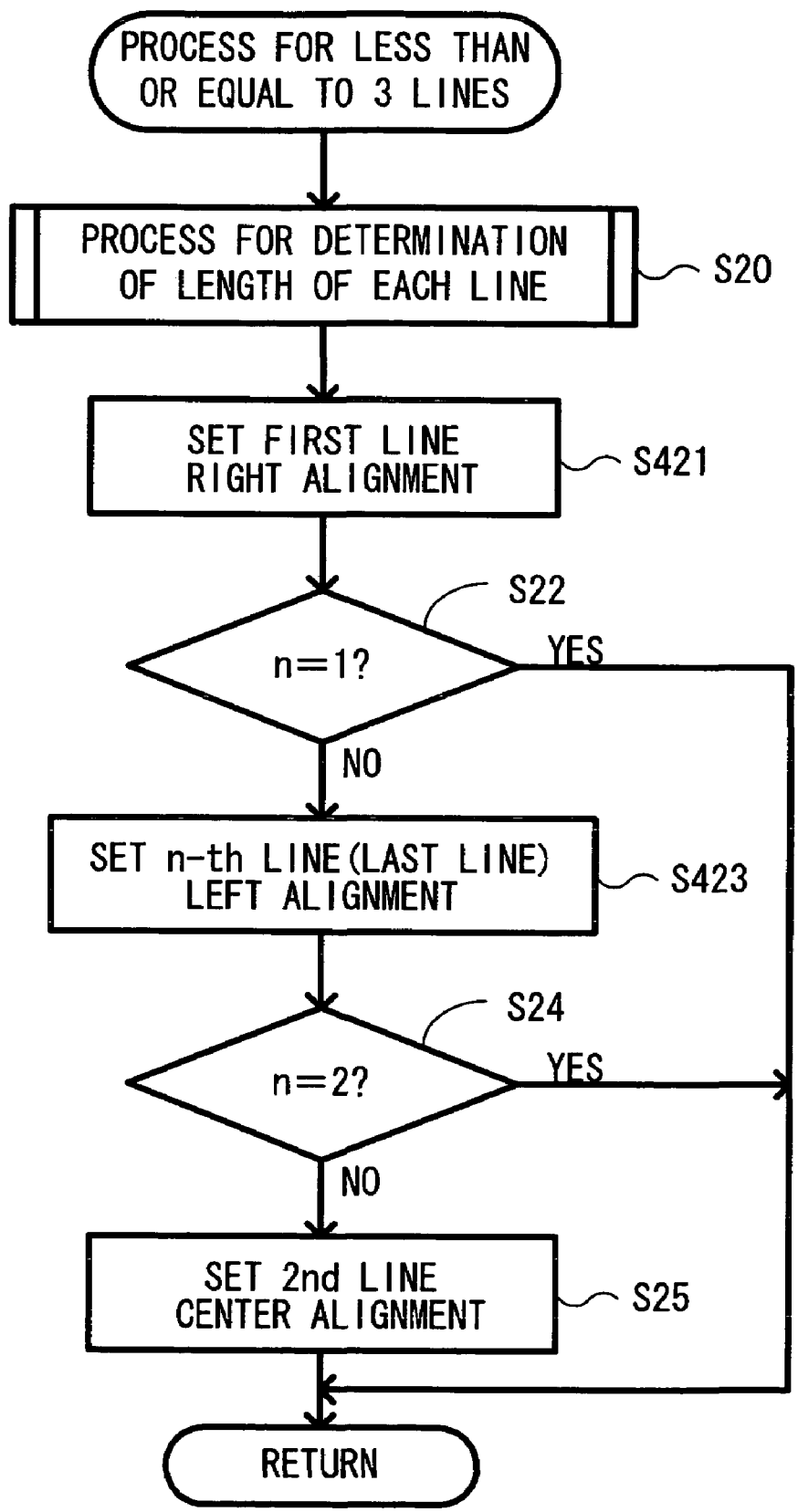
FIG. 18 is a flowchart of process for less than or equal to 3 lines in the second embodiment.
Figure 19:
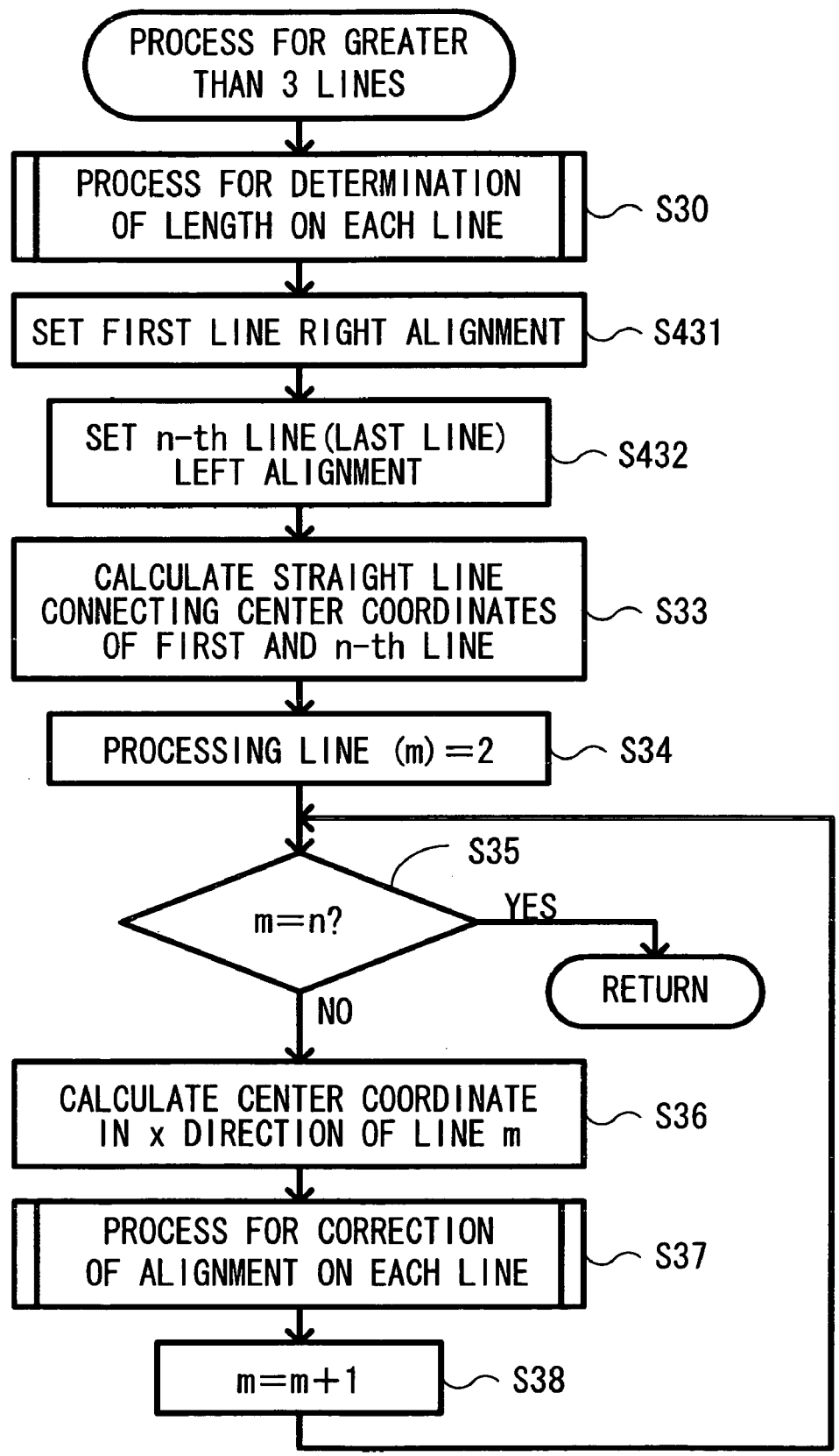
FIG. 19 is a flowchart of process for more than 3 lines in the second embodiment.

Only the differences between the second embodiment and the first embodiment will be described in detail below. FIG. 18 is a flowchart of the process for less than or equal to 3 lines in the second embodiment. FIG. 19 is a flowchart of process for more than 3 lines in the second embodiment. Only steps changed in FIGS. 18 and 19 will be described below. Moreover, the steps not changed are omitted to explain with the corresponding step reference numbers not changed. FIG. 18 is a flowchart in which the left alignment of S21 is replaced by the right alignment and the right alignment of S23 is replaced by the left alignment in the flowchart of the process for less than or equal to 3 lines of FIG. 4. The first line is set to right alignment in S421 and the process then proceeds to S22. The last line is set to left alignment in S432 and the process then proceeds to S24. FIG. 19 is a flowchart in which the left alignment of S31 is replaced by the right alignment and the right alignment of S32 is replaced by the left alignment in the flowchart of the process for more than 3 lines of FIG. 5. The first line is set to right alignment in S431, the last line is set to left alignment in S432 and the process then proceeds to S22. Such alignment allows to be alignment with the first line in right alignment and the last line in left alignment as FIGS. 14-17. Moreover, in regard to the fonts in mirror image, mirror imaged fonts may be separately provided or the fonts may be converted in mirror image when the font expansion.

Although the description has been with reference to exemplary embodiments, it is to be understood the disclosure is not limited to the exemplary embodiments or structure. Although the various elements of the exemplary embodiments are shown in various combinations and configurations, other combinations and configurations, including more, less or only a single element, are also within the spirit and scope of the disclosure.

What is claimed is:

1. A print data editing device, comprising:
   a memory that stores print data;
   a controller that reads the print data stored in the memory, said controller aligns first line of the print data to a first end of a predetermined print area,
   said controller determines whether the print data includes plural lines,
   said controller aligns a last line of the print data to a second end when the print data is determined to include plural lines, and aligns a remaining line between the first and second ends, the remaining line being a line other than the first and last line when the print data is determined to include more than two lines, and
   said controller further calculates a straight line connecting a first coordinate and second coordinate:
   the first coordinate being a center coordinate of print data range on the first line aligned to a first end within the print area, and the second coordinate being a center coordinate of the print data range on the last line aligned to the second end;
   the controller further aligns the center coordinate of the print data range on the remaining line on the calculated straight line and aligns the print data on each remaining line between the first and second ends within the print area based on the each aligned center coordinate.

2. The print data editing device according to claim 1, wherein
   the controller further determines whether the print data range on each line is longer than width of the print area; and reduces a size of the print data on the particular line when the print data range on a particular line is determined to be longer than the width of the print area.

3. The print data editing device according to claim 1, wherein the controller determines whether head or tail of the print data on the remaining line protrudes out of the print area when the print data on the remaining line is aligned based on the center coordinate, and size of the print data on the protruding line is reduced when a protrusion is determined.

4. The print data editing device according to claim 1, wherein the controller
   determines whether head or tail of the print data on the remaining line protrudes out of the print area when the print data on the remaining line is aligned based on the center coordinate; moves the head on the protruding line to left end of the print area when protrusion is determined to be out of left side of the protruding line;
   moves the tail on the protruding line to right end of the print area when protrusion is determined to be out of right side of the protruding line;
   calculates a straight line connecting a third coordinate and fourth coordinate, the third coordinate being a center coordinate of moved print data range, the fourth coordinate being a center coordinate of the print data range of the last line aligned to the second end within the print area;
   aligns center coordinate of the print data range on a following line on the calculated straight line, the following line being line after the moved line; and
   aligns the following line between the first and second ends within the print area based on the realigned center coordinate.

5. A computer readable medium containing instructions for controlling a computer to perform print editing, by:
   a storing step of storing print data;
   a first aligning step of reading the print data stored in a memory and aligning a first line of the print data to a first end of a predetermined print area;
   a number of lines determining step of determining whether the print data includes plural lines;
   a second aligning step of aligning a last line of the print data to a second end when the print data is determined to include plural lines by the number of lines determining step; and
   a remaining line aligning step of aligning a remaining line between the first and second ends when the print data is determined to include more than two lines by the number of line determining step, the remaining line being a line other than the first and last line, and a center coordinate line calculating step of calculating a straight line connecting a first coordinate and second coordinate, the first coordinate being a center coordinate of the print data range on the first line aligned to a first end within the print area by the first aligning step, and the second coordinate being a center coordinate of the print data range on the last line aligned by the second aligning step to the second end;

a center coordinate aligning step of aligning the center coordinate of the print data range of the remaining line on the straight line calculated by the center coordinate line calculating step;

wherein the remaining line aligning step aligns each remaining line between the first and second ends within the print area based on the each center coordinate aligned by the center coordinate aligning step.

6. The computer readable medium of claim 5, further containing instructions for controlling the computer to perform print editing, by:

a line length determining step of determining whether the print data range on each line is longer than width of the print area; and a first reducing step of reducing size of the print data on the particular line when the print data range on a particular line is determined to be longer than the width of the print area.

7. The computer readable medium of claim 5, further containing instructions for controlling the computer to perform print editing, by:

a protrusion determining step of determining whether head or tail of the print data on the remaining line protrudes out of the print area when the print data on the remaining line is aligned by the center coordinate aligning step based on the center coordinate; and a second reducing step of reducing size of the print data on the protruding line when protrusion is determined by the protrusion determining step.

8. The computer readable medium of claim 5, further containing instructions for controlling the computer to perform print editing, by:

a protrusion determining step of determining whether head or tail of the print data on the remaining line protrudes out of the print area when the print data on the remaining line is aligned by the center coordinate aligning step based on the center coordinate;

a moving step of moving the head on the protruding line to left end of the print area when protrusion is determined to be out of left side of the protruding line by the protrusion determining step, and moving the tail on the protruding line to right end of the print area when protrusion is determined to be out of right side of the protruding line by the protrusion determining step;

a center coordinate line recalculating step of calculating a straight line connecting a third coordinate and fourth coordinate, the third coordinate being a center coordinate of the moved print data range, and the fourth coordinate being a center coordinate of the print data range of the last line aligned by the second aligning step to the second end;

a realigning step of aligning center coordinate of print data range on a following line on the straight line calculated by the center coordinate line recalculating step, the following line being line after the moved line;

wherein the remaining line aligning step aligns the following line between the left and right end within the print area based on the center coordinate realigned by the realigning step.

* * * * *